(12) United States Patent
Woods

(10) Patent No.: US 7,640,893 B2
(45) Date of Patent: Jan. 5, 2010

(54) PET GROOMING TOOL

(76) Inventor: Lawrence A. Woods, 655 S. 34th St., Space # B-15, San Jose, CA (US) 95116

( * ) Notice: Subject to any disclaimer, the term of this patent is extended or adjusted under 35 U.S.C. 154(b) by 376 days.

(21) Appl. No.: 11/521,764

(22) Filed: Sep. 15, 2006

(65) Prior Publication Data
US 2008/0066691 A1 Mar. 20, 2008

(51) Int. Cl.
A01K 13/00 (2006.01)

(52) U.S. Cl. ...................... 119/613; 119/601

(58) Field of Classification Search ............... 119/611, 119/613, 614–616; 15/159.1, 160, 207.2, 15/179, 201, 105, 104.001, 104.002, 230.11; 132/120; 492/13, 14
See application file for complete search history.

(56) References Cited

U.S. PATENT DOCUMENTS

| 185,749 | A | * | 12/1876 | Holmes et al. | 15/160 |
| 317,341 | A | * | 5/1885 | Gridley | 119/631 |
| 360,301 | A | | 3/1887 | Jennes | |
| 413,662 | A | * | 10/1889 | Havemann | 119/613 |
| 463,942 | A | | 11/1891 | Cole | |
| 681,707 | A | | 9/1901 | Johnson | |
| 702,338 | A | * | 6/1902 | Boord | 15/105 |
| 717,377 | A | | 12/1902 | Flanders | |
| 753,056 | A | | 2/1904 | Ewart | |
| 924,010 | A | * | 6/1909 | Sourek | 119/616 |
| 1,093,941 | A | * | 4/1914 | Lurch | 132/124 |
| 1,285,957 | A | | 11/1918 | Eckert | |
| 1,442,757 | A | * | 1/1923 | White | 132/117 |
| 1,746,311 | A | * | 2/1930 | King | 156/574 |
| 2,207,427 | A | * | 7/1940 | Behr | 132/120 |
| 2,613,679 | A | * | 10/1952 | Vaughn | 132/122 |
| 3,363,276 | A | * | 1/1968 | Thomas, Jr. | 15/105 |
| 3,628,547 | A | * | 12/1971 | Catania | 132/148 |
| 4,799,457 | A | | 1/1989 | Gordon | |
| 5,168,833 | A | * | 12/1992 | Spears | 119/603 |
| 5,230,303 | A | * | 7/1993 | Rubino | 119/603 |
| 5,323,793 | A | * | 6/1994 | Lorenzi | 132/275 |
| 5,471,703 | A | * | 12/1995 | Niven | 15/230.11 |
| 5,730,687 | A | * | 3/1998 | Ledany | 482/121 |
| D459,546 | S | * | 6/2002 | Meyer et al. | D28/30 |
| 6,973,696 | B1 | * | 12/2005 | Koumarianos | 15/230.11 |
| 7,377,001 | B2 | * | 5/2008 | McKay | 15/23 |
| 2004/0065271 | A1 | * | 4/2004 | Cheng | 119/625 |
| 2007/0079842 | A1 | * | 4/2007 | Glynn et al. | 132/108 |

* cited by examiner

Primary Examiner—Son T. Nguyen
(74) Attorney, Agent, or Firm—GSS Law Group

(57) ABSTRACT

A grooming tool which includes a number of latex surgical tubing pieces generally arranged in parallel to one another, and anchored together at corresponding opposite ends. A handle provides for a user to draw the plurality of latex surgical tubing pieces across an animal for grooming.

10 Claims, 4 Drawing Sheets

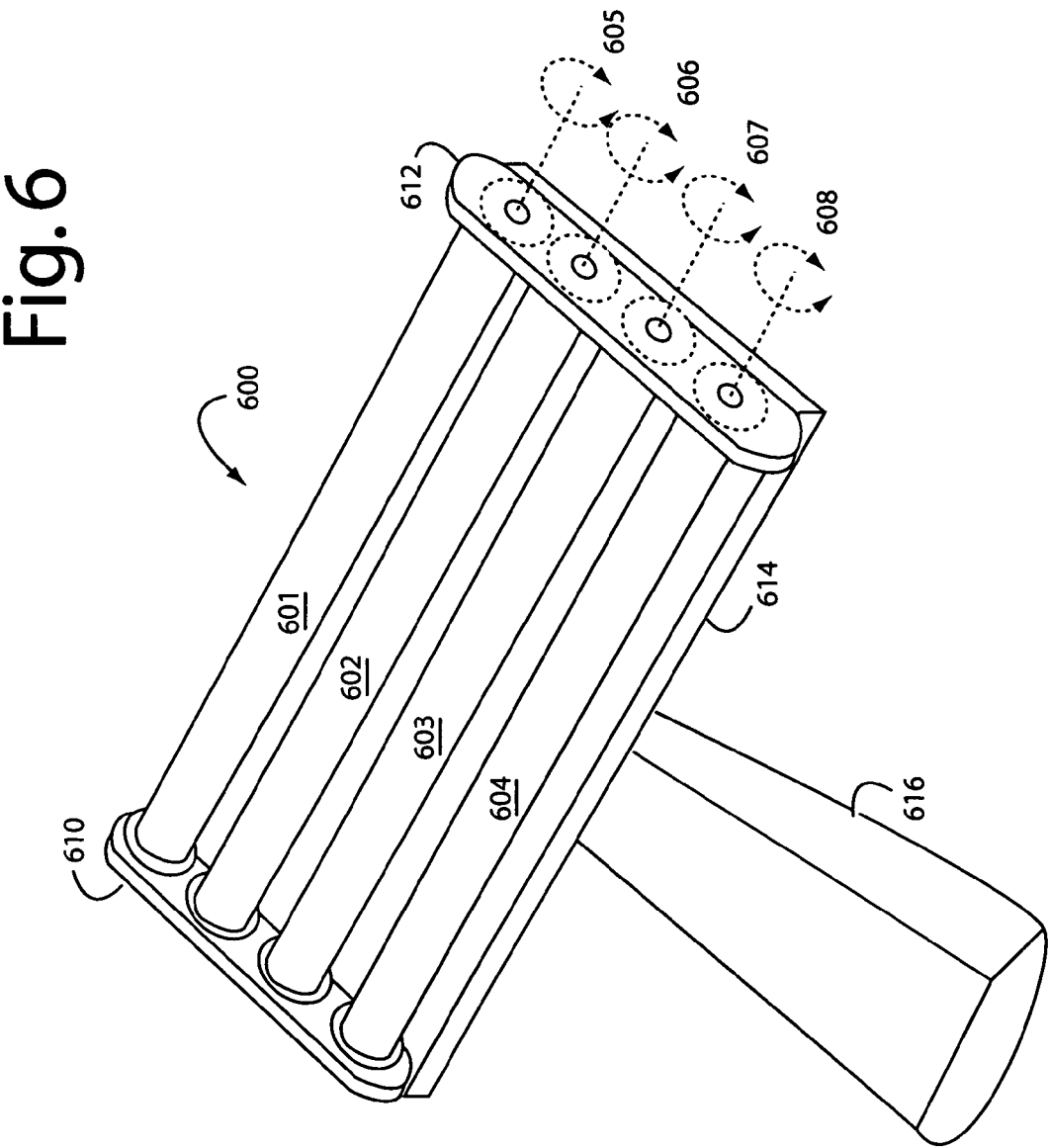

PET GROOMING TOOL

FIELD OF THE PRESENT INVENTION

The present invention relates to grooming tools for animals, and in particular to brushes and combs for removing loose animal hair or fur.

BACKGROUND

Keeping an animal healthy and clean includes grooming their fur to remove loose hairs and debris. Various combs and brushes have been marketed that do well in one situation or the other. Richard Gordon describes a grooming comb for pets in U.S. Pat. No. 4,799,457, issued Jan. 24, 1989. It comprises a combined shredding and grooming tool made from a strip of plastic with two different types of comb teeth on its edges, and handles on opposite ends.

Frederick Eckert describes a grooming element in U.S. Pat. No. 1,285,957, issued Nov. 26, 1918. A brush with a handle is provided that is said to be especially good at removing mud and dirt from the legs of draft animals. Several parallel even loops of wire are each anchored at both ends and bow out from a backing board. The wire loops are drug crosswise across the dirt to be brushed off.

Hugo Ewart describes a currycomb in U.S. Pat. No. 753,056, issued Feb. 23, 1904, that is essentially made entirely from wire. A brush arrangement is made by twisting rows of wire to form loops that act like teeth or bristles. Several rows of these are set in parallel and a wire-formed handle is attached.

Another currycomb or card cleaner is described by Charles Flanders in U.S. Pat. No. 717,377, issued Dec. 30, 1902. Here, a snap-on grille is placed over the bristles of a brush. When the bristles load up with hair, the hair is easily removed by removing the grille.

A linked chain-mail wire material is wrapped around the drum of a brush and handle to form a round currycomb brush in U.S. Pat. No. 681,707, issued Sep. 3, 1901, to James Johnson. The rounded teeth-like projections of the interlinked parallel coils of wire do not get clogged and are easily cleaned.

William Cole describes a horse cleaner brush in U.S. Pat. No. 463,942, issued Nov. 24, 1891. A round handle supports a cylindrical frame over which several parallel straight wires are longitudinally strung. The strings resemble those of a violin, but wrap around the entire circumference over a grooved head at the end opposite to the handle. The string tension is made adjustable to make the wires taut.

Orlando Jenness describes a curry comb in a flat brush arrangement with a handle in U.S. Pat. No. 360,301, issued Mar. 29, 1887. Several strands of twisted ribbons of metal are arranged in parallel above a box-like frame and backer board. These "bars" are traversely dragged across an animal's fur to clean and groom it. The resulting comb is said to control dust and provide a very long service life.

What is needed is a bush that grooms animals quickly and efficiently, and that is easy to clean and use again.

SUMMARY OF THE PRESENT INVENTION

The invention includes an animal grooming tool, made in accord with the invention, in which a plurality of latex surgical tubing pieces generally arranged in parallel to one another, and anchored as a group at corresponding opposite ends, and a handle providing for a user to draw the plurality of latex surgical tubing pieces across an animal for grooming.

In one embodiment of the present invention comprises a number natural rubber latex surgical tubing strung in parallel between rotatable matching disks or arms. The tubing arrangements can be parallel in a plane, or in a cylinder. The rotating parts are mounted to a handle to allow the brushing action on an animal to cause the rotation. The surgical tubing stretches and grips during use and clings to loose hairs and debris. An auxiliary comb with graduated teeth spacing is provided to assist with grooming.

An advantage of the present invention is a grooming tool is provided that is effective and easy to use.

Another advantage of the present invention is a grooming tool is provided that can be used for massage and improving blood circulation in the skin.

A further advantage of the present invention is a grooming tool is provided that is easy to clean of hair.

The above summary of the present invention is not intended to represent each disclosed embodiment, or every aspect, of the present invention. Other aspects and example embodiments are provided in the figures and the detailed description that follow.

BRIEF DESCRIPTION OF THE DRAWINGS

The present invention may be more completely understood in consideration of the following detailed description of various embodiments of the present invention in connection with the accompanying drawings, in which:

FIG. 6 is a perspective view diagram of a brush embodiment of the present invention in which several equal lengths of surgical tubing are arranged in parallel and allowed to each turn on its own axis to promote adhesion to an animal's hair and removal during grooming.

Figure 1:
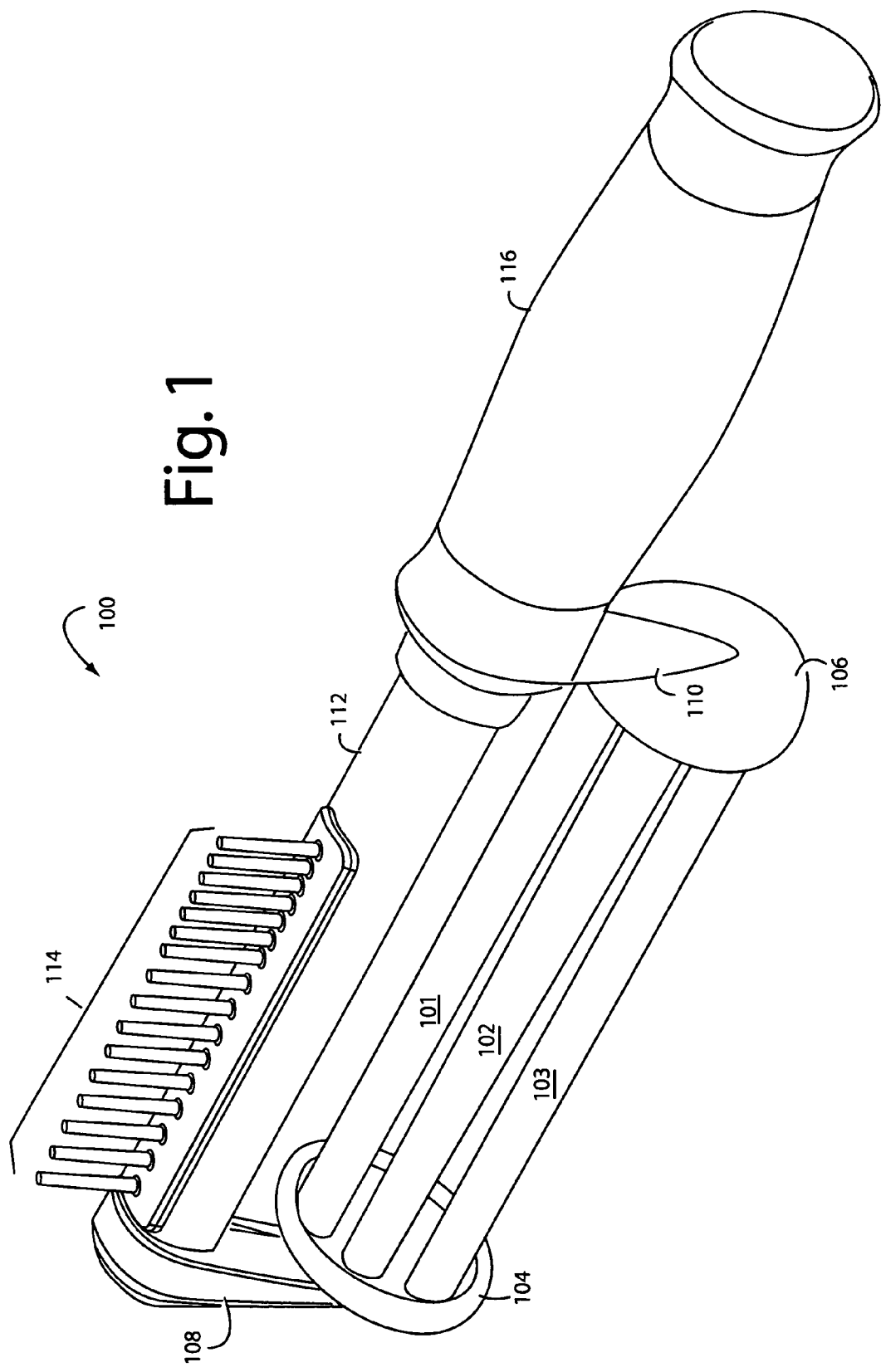
FIG. 1 is a perspective view diagram of grooming tool embodiment of the present invention showing a rotating cylindrical arrangement of surgical tubing and a comb on a brush handle.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION

In general, the invention includes an animal grooming tool with a plurality of latex surgical tubing pieces generally arranged in parallel to one another, and anchored as a group at corresponding opposite ends. Preferred embodiments also include a handle providing for a user to draw the plurality of latex surgical tubing pieces across an animal for grooming.

FIG. 1 shows a grooming tool embodiment of the present invention, and is referred to herein by the general reference numeral 100. The grooming tool 100 may be used as a brush and comb to groom animals. It comprises several pieces of latex surgical tubing 101-103 strung between rotatable disks 104 and 106. These turn like a drum on two arms 108 and 110 attached to a shaft 112. A comb 114 is mounted on the back of shaft 112 and spaces some of its teeth farther apart on one end than the other. The user can then choose which part of the tool is best to use when encountering different types or hair, fur, and dirt. A handle 116 is provided for comfortable use.

The use of latex surgical tubing 101-103 is critical to the present invention. The material properties of natural rubber latex provide a combination of adhesion and flexibility that is very efficient in grooming when allowed to rotate in an assembly as shown in FIG. 1. Silicone tubing may be a useful alternative, but such may not cling to hair so well. Here, in FIG. 1, three pieces of latex tubing 101-103 are visible, but four or more pieces can also be used. A prototype that worked well used four pieces of ⅜" ID latex tubing arranged in a circle about 1.5" in diameter. That provided about ¾" between adjacent pieces. During use, the pieces 101-103 while rotating and being pressed against the animal can be drawn closer together. There may be an advantage to make the tubing a bit longer than is necessary to bridge the distance between disks 104 and 106. Such prototype spaced the disks 104 and 106 about 5-6" apart. The materials used for the rest of the construction are conventional, e.g., ordinary plastics, metals, or wood.

Figure 2:
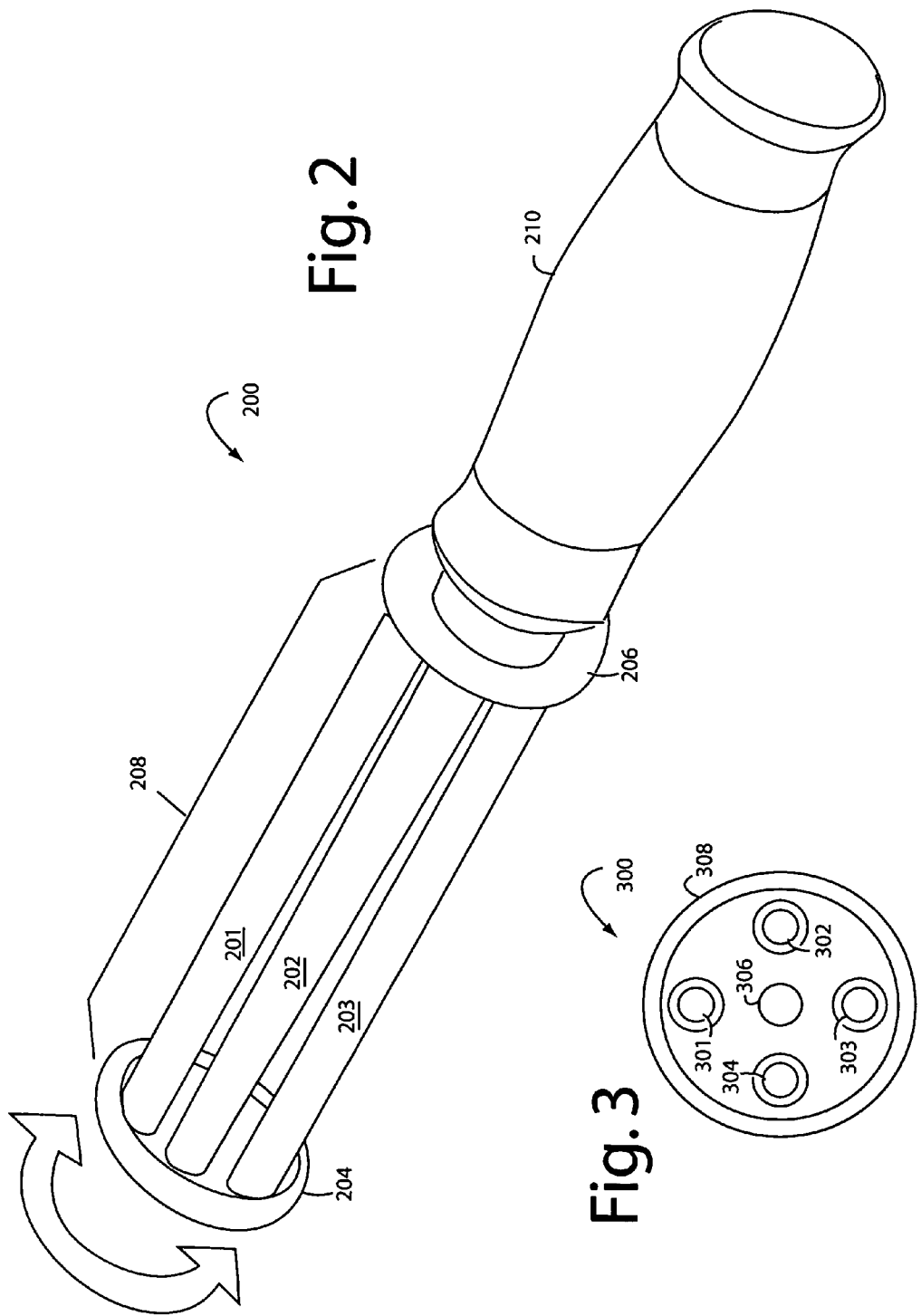
FIG. 2 is a perspective view diagram of another grooming tool embodiment of the present invention showing a rotating cylindrical arrangement of surgical tubing only on a brush handle.

FIG. 2 represents brush embodiment of the present invention, and is referred to herein by the general reference numeral 200. The brush 200 is similar to that of FIG. 1, but has no comb and a simpler handle. Brush 200 also has several pieces of latex surgical tubing 201-203 strung between rotatable disks 204 and 206. These turn together as a drum assembly 208 spindled to a handle 210.

Figure 3:
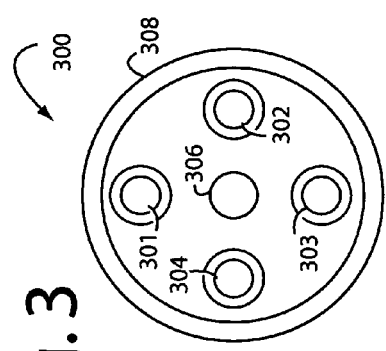
FIG. 3 is a plan view diagram of an end disk with four tubing nipples arranged in a circle that could be used in the brushes illustrated in FIGS. 1 and 2.

FIG. 3 shows a detailed view of a disk 300 similar to disks 204 and 206 of FIG. 2 and 104 and 106 of FIG. 1. Each piece of surgical tubing is connected to a nipple 301-304, e.g., ⅜" in diameter and in length. A center hole 306 provides for an axle, e.g., a simple shaft with machine screws and nuts snugged tight enough to allow rotation without wobbling. These are all disposed on an end plate 308. In an alternative embodiment, assembly 208 does not rotate on handle 210, the user simply allows the whole brush to roll over the animal's fir during grooming.

Figure 4:
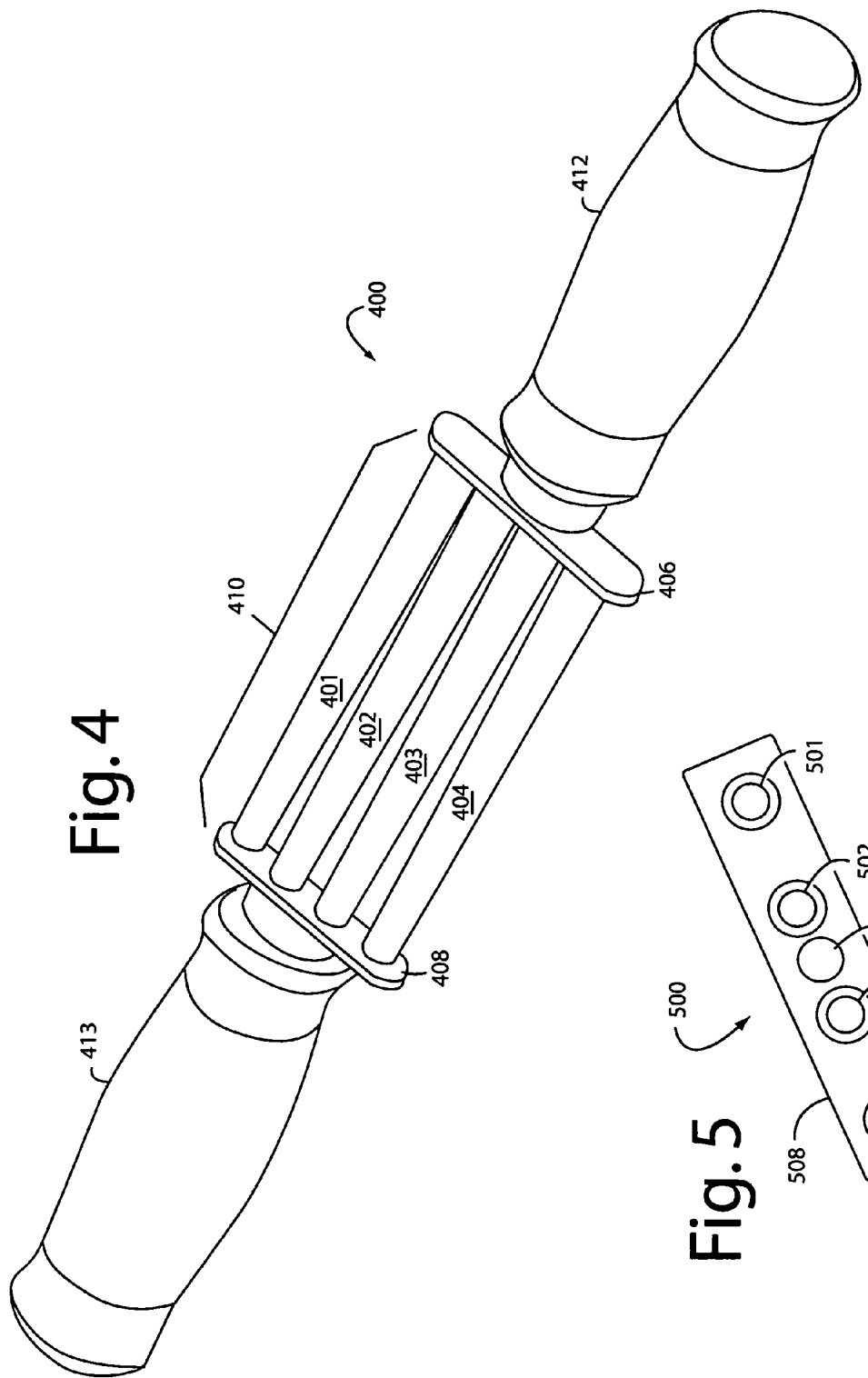
FIG. 4 is a perspective view diagram of a third grooming tool embodiment of the present invention showing a rotating flat panel arrangement of surgical tubing on a brush handle.

FIG. 4 represents another brush embodiment of the present invention, and is referred to herein by the general reference numeral 400. The brush 400 is similar to that of FIG. 2, but has flat arrangement. Brush 400 also has four pieces of latex surgical tubing 401-404 strung between rotatable stretchers 406 and 408. These turn together as a drum assembly 410 spindled in tandem to handles 412-413. Two hands can be used with the two handles 412-413 to apply more pressure than could be comfortably applied with one hand using only a single handle 412.

Such spindle may be best if the latex surgical tubing 401-404 strung between rotatable stretchers 406 and 408 are allowed to be a bit floppy or loose. It may also be advantageous for the spindle arrangement to the rotatable stretchers 406 and 408 to be locked together.

Four pieces of latex surgical tubing 401-404 are shown here in FIG. 4 being strung between rotatable stretchers 406 and 408, but the best number of tubings, tubing size and tubing lengths will depend on the particular application. In an alternative embodiment, assembly 410 does not rotate on handle 412, or handles 412-413, the user simply allows the whole brush 400 to occasionally fold or flop over the animal's fur during grooming.

Figure 5:
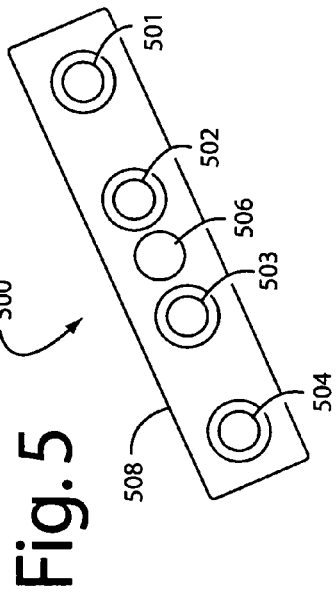
FIG. 5 is a plan view diagram of an arm with four tubing nipples arranged in a flat panel that could be used in the brush illustrated in FIG. 4.

FIG. 5 shows a detailed view of a rotatable stretcher 500 similar to rotatable stretchers 406 and 408 of FIG. 4. Each piece of surgical tubing is connected to a nipple 501-504, e.g., ⅜" in diameter and in length. A typical length would be about six inches. A center hole 506 provides for an axle, e.g., a simple shaft with machine screws and nuts snugged tight enough to allow rotation. These are all disposed on an end plate 508.

FIG. 6 illustrates a flat brush embodiment of the present invention, and is referred to herein by the general reference numeral 600. Brush 600 uses the arrangement of several surgical tube pieces 601-604 all of equal length. There may be some advantage in particular applications to not keeping the surgical tube pieces 601-604 all of equal length. Here, each can spin on a corresponding axis 605-608, either as a gang or individually, depending on application. End plates 610 and 612 provide axle support and attack to a backing plate 614. A handle 616 allows the user to draw the brush across an animal's fur for grooming.

Many arrangements of surgical tubing are possible that would be useful in grooming. For example, a frame something like an empty tennis racket strung with a coil of surgical tubing with parallel windings between the frame perimeters may work and be inexpensive to manufacture.

Silicone tubing has a better deterioration rate but it is surpassed by latex surgical tubing in elasticity, flexibility and gripping power. Latex surgical tubing is flexible in sub-zero temperatures, maintains memory after repeated stretching, and has tremendous holding strength adhesiveness. Latex surgical tubing comes in black or amber, here is no difference in the properties of colors. Latex products are manufactured from a milky fluid derived from the rubber tree, *Hevea brasiliensis*. Several chemicals are added to this fluid during the processing and manufacture of commercial latex. Some individuals are allergic to latex contact, and an alternative rubber-like material may be better in some uses.

While the present invention has been described with reference to several particular example embodiments, those skilled in the art will recognize that many changes may be made thereto without departing from the spirit and scope of the present invention, which is set forth in the following claims.

The invention claimed is:

1. An animal grooming tool, comprising:
    a plurality of latex surgical tubing pieces generally arranged parallel to one another, and anchored as a group at corresponding opposite ends;
    a handle providing for a user to draw said plurality of latex surgical tubing pieces across the animal for grooming;
    a shaft having an outer surface, wherein said shaft is attached to said handle;
    a toothed comb comprising a plurality of comb teeth attached to said shaft, wherein said comb teeth extend in a first direction approximately perpendicular to said outer surface of said shaft; and
    a first arm and a second arm, wherein said first arm and said second arm extend from said surface of said shaft in a second direction opposite to said first direction and said plurality of latex surgical tubing pieces are rotatably coupled to said first and second arms.

2. The grooming tool of claim 1, further comprising:

a rotatable assembly providing for rotation of said plurality of latex surgical tubing pieces relative to said handle during grooming.

3. The grooming tool of claim 1, further comprising:

a frame for arranging said plurality of latex surgical tubing pieces in a cylindrical array that can roll over the animal during grooming.

4. The grooming tool of claim 1, further comprising:

a plurality of axles providing for rotation of each one of said plurality of latex surgical tubing pieces during grooming.

5. The grooming tool of claim 1, wherein said plurality of latex surgical tubing pieces are approximately equal in length.

6. A method for grooming an animal, comprising:

providing an animal grooming tool as claimed in claim 1; and alternately drawing said plurality of latex surgical tubing across the animal, and said toothed comb across the animal.

7. The method of claim 6, further comprising:

providing a rotatable assembly for rotation of the plurality of latex surgical tubing pieces relative to said handle during grooming.

8. The method of claim 6, further comprising:

arranging said plurality of latex surgical tubing pieces in a cylindrical array that can roll over the animal during grooming.

9. The method of claim 6, further comprising:

providing for the rotation of each one of the plurality of latex surgical tubing pieces during grooming.

10. The method of claim 6, wherein said plurality of latex surgical tubing pieces are general equal in length.

* * * * *